US012637222B2

(12) United States Patent

Combes et al.

(10) Patent No.: US 12,637,222 B2
(45) Date of Patent: May 26, 2026

(54) PROPULSION SYSTEM FOR AN AIRCRAFT COMPRISING A TURBOJET, A PYLON AND ENGINE ATTACHMENT

(71) Applicant: Airbus Operations SAS, Toulouse (FR)

(72) Inventors: Pierre-Antoine Combes, Toulouse (FR); Marc De Nicola, Toulouse (FR); Germain Gueneau, Toulouse (FR); Olivier Pautis, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 0 days.

(21) Appl. No.: 18/761,958

(22) Filed: Jul. 2, 2024

(65) Prior Publication Data

US 2025/0121946 A1      Apr. 17, 2025

Related U.S. Application Data

(60) Provisional application No. 63/512,101, filed on Jul. 6, 2023, provisional application No. 63/512,100, filed on Jul. 6, 2023.

(30) Foreign Application Priority Data

Jun. 26, 2024    (EP) .................................... 24184671

(51) Int. Cl.
   *B64D 27/40*       (2024.01)
   *B64C 3/32*        (2006.01)
   (Continued)

(52) U.S. Cl.
   CPC .............. *B64D 27/402* (2024.01); *B64C 3/32* (2013.01); *B64D 27/40* (2024.01); *B64D 27/404* (2024.01); *B64D 29/06* (2013.01); *B64D 27/18* (2013.01)

(58) Field of Classification Search
   CPC .... B64D 27/402; B64D 27/404; B64D 27/40; B64D 27/18; B64C 3/32
   (Continued)

(56) References Cited

U.S. PATENT DOCUMENTS 2,965,338 A * 12/1960 Mclean ................. F16F 1/3842
                                                            248/556
3,675,418 A *  7/1972 Lenkeit ..................... F02C 7/20
                                                            244/54
(Continued)

FOREIGN PATENT DOCUMENTS

CA         2958515 A1    8/2017
FR         2915527 A1 * 10/2008  ............. B64D 29/08
   (Continued)

OTHER PUBLICATIONS

European Search Report for corresponding European Patent Application No. 24184671.6 dated Nov. 5, 2024.

*Primary Examiner* — Taylor Morris
(74) *Attorney, Agent, or Firm* — Greer, Burns & Crain, Ltd.

(57) ABSTRACT

A propulsion system of an aircraft comprising a turbojet extending around a longitudinal axis and having a vertical median plane passing through the longitudinal axis and having a fan casing with a rear face perpendicular to the longitudinal axis, a pylon presenting a rigid structure with a front wall and a lower spar, and an engine attachment comprising a front ring coaxial with the longitudinal axis and comprising first fixation element for securing the front ring to the rear face of the fan casing and second fixation element for securing the front ring to the front wall of the pylon.

9 Claims, 4 Drawing Sheets

(51) Int. Cl.
 B64D 29/06 (2006.01)
 B64D 27/18 (2006.01)
(58) Field of Classification Search
 USPC ......................................................... 248/554
 See application file for complete search history.

(56) References Cited

U.S. PATENT DOCUMENTS

| | | | | |
|---|---|---|---|---|
| 3,831,888 | A * | 8/1974 | Baker | B64D 27/406 |
| | | | | 244/54 |
| 4,065,077 | A * | 12/1977 | Brooks | B64D 27/404 |
| | | | | 60/797 |
| 4,458,863 | A * | 7/1984 | Smith | B64D 27/18 |
| | | | | 239/265.29 |
| 4,603,821 | A * | 8/1986 | White | B64D 27/18 |
| | | | | 60/797 |
| 5,176,339 | A * | 1/1993 | Schmidt | B64D 27/00 |
| | | | | 60/797 |
| 5,226,288 | A * | 7/1993 | Cornax | F02C 7/20 |
| | | | | 60/797 |
| 5,443,229 | A * | 8/1995 | O'Brien | B64D 27/20 |
| | | | | 60/797 |
| 5,806,792 | A * | 9/1998 | Brossier | F02C 7/20 |
| | | | | 244/54 |
| 5,871,177 | A * | 2/1999 | Demouzon | B64D 27/406 |
| | | | | 60/797 |
| 6,126,110 | A | 10/2000 | Seaquist | B64D 27/18 |
| | | | | 244/54 |
| 7,232,091 | B2 * | 6/2007 | Marche | B64D 27/402 |
| | | | | 244/54 |
| 7,806,363 | B2 * | 10/2010 | Udall | F02C 7/20 |
| | | | | 248/556 |
| 7,971,825 | B2 * | 7/2011 | Diochon | B64D 27/18 |
| | | | | 244/54 |
| 8,561,940 | B2 * | 10/2013 | Lisiewicz | B64D 27/14 |
| | | | | 244/54 |
| 8,651,416 | B2 * | 2/2014 | Journade | B64D 27/18 |
| | | | | 244/54 |
| 8,668,441 | B2 | 3/2014 | Vauchel | |
| 8,739,552 | B2 * | 6/2014 | Vauchel | B64D 29/00 |
| | | | | 244/54 |
| 8,740,136 | B2 * | 6/2014 | Audart-Noel | B64D 27/402 |
| | | | | 244/54 |

| | | | | |
|---|---|---|---|---|
| 9,027,876 | B2 * | 5/2015 | Durand | B64D 27/402 |
| | | | | 244/54 |
| 9,784,135 | B2 | 10/2017 | Ancuta et al. | |
| 10,562,639 | B2 * | 2/2020 | Pautis | B64D 27/404 |
| 10,647,440 | B2 * | 5/2020 | Bouchet | B64D 27/402 |
| 11,479,104 | B2 * | 10/2022 | Appleby | B60K 5/1216 |
| 2005/0116093 | A1 * | 6/2005 | Machado | B64D 27/12 |
| | | | | 244/54 |
| 2008/0067287 | A1 | 3/2008 | Guibert et al. | |
| 2009/0189014 | A1 | 7/2009 | Balk | |
| 2010/0040466 | A1 * | 2/2010 | Vauchel | F02C 7/20 |
| | | | | 415/213.1 |
| 2010/0043450 | A1 * | 2/2010 | Marche | B64C 39/10 |
| | | | | 60/797 |
| 2010/0059634 | A1 * | 3/2010 | Vauchel | B64D 29/06 |
| | | | | 292/341.16 |
| 2010/0084507 | A1 * | 4/2010 | Vauchel | F02C 7/04 |
| | | | | 244/1 N |
| 2010/0147996 | A1 * | 6/2010 | Hartshorn | B64D 27/404 |
| | | | | 244/54 |
| 2010/0229526 | A1 * | 9/2010 | Germain | B64D 29/06 |
| | | | | 60/226.1 |
| 2011/0127369 | A1 * | 6/2011 | Dussol | B64D 27/402 |
| | | | | 244/54 |
| 2012/0091265 | A1 * | 4/2012 | Stretton | B64D 27/14 |
| | | | | 244/54 |
| 2017/0197724 | A1 | 7/2017 | Pautis et al. | |
| 2017/0240288 | A1 | 8/2017 | Pautis et al. | |
| 2017/0291713 | A1 * | 10/2017 | Perse | F01D 21/045 |
| 2018/0148186 | A1 * | 5/2018 | Bouchet | G01K 13/02 |
| 2019/0009918 | A1 * | 1/2019 | Zameroski | B64D 27/404 |
| 2019/0055026 | A1 * | 2/2019 | Sawyers-Abbott | |
| | | | | B64D 27/406 |
| 2019/0359352 | A1 | 11/2019 | Cooper | |
| 2020/0207481 | A1 * | 7/2020 | Combes | B64D 27/406 |
| 2021/0070459 | A1 * | 3/2021 | West | B64D 27/18 |
| 2023/0365247 | A1 * | 11/2023 | Stevens | B64D 27/18 |
| 2023/0406521 | A1 * | 12/2023 | Kioua | B64D 27/402 |
| 2024/0270396 | A1 * | 8/2024 | Beutin | F02C 7/36 |

FOREIGN PATENT DOCUMENTS

| | | | | | |
|---|---|---|---|---|---|
| FR | | 3114129 | A1 * | 3/2022 | ............ B64D 27/402 |
| GB | | 2360749 | A * | 10/2001 | ............ B64D 27/406 |
| JP | | 2009173277 | A | 8/2009 | |
| WO | WO-2012085388 | A1 * | 6/2012 | ............ B64D 27/406 |
| WO | WO-2025120280 | A1 * | 6/2025 | ............ B64D 27/10 |

* cited by examiner

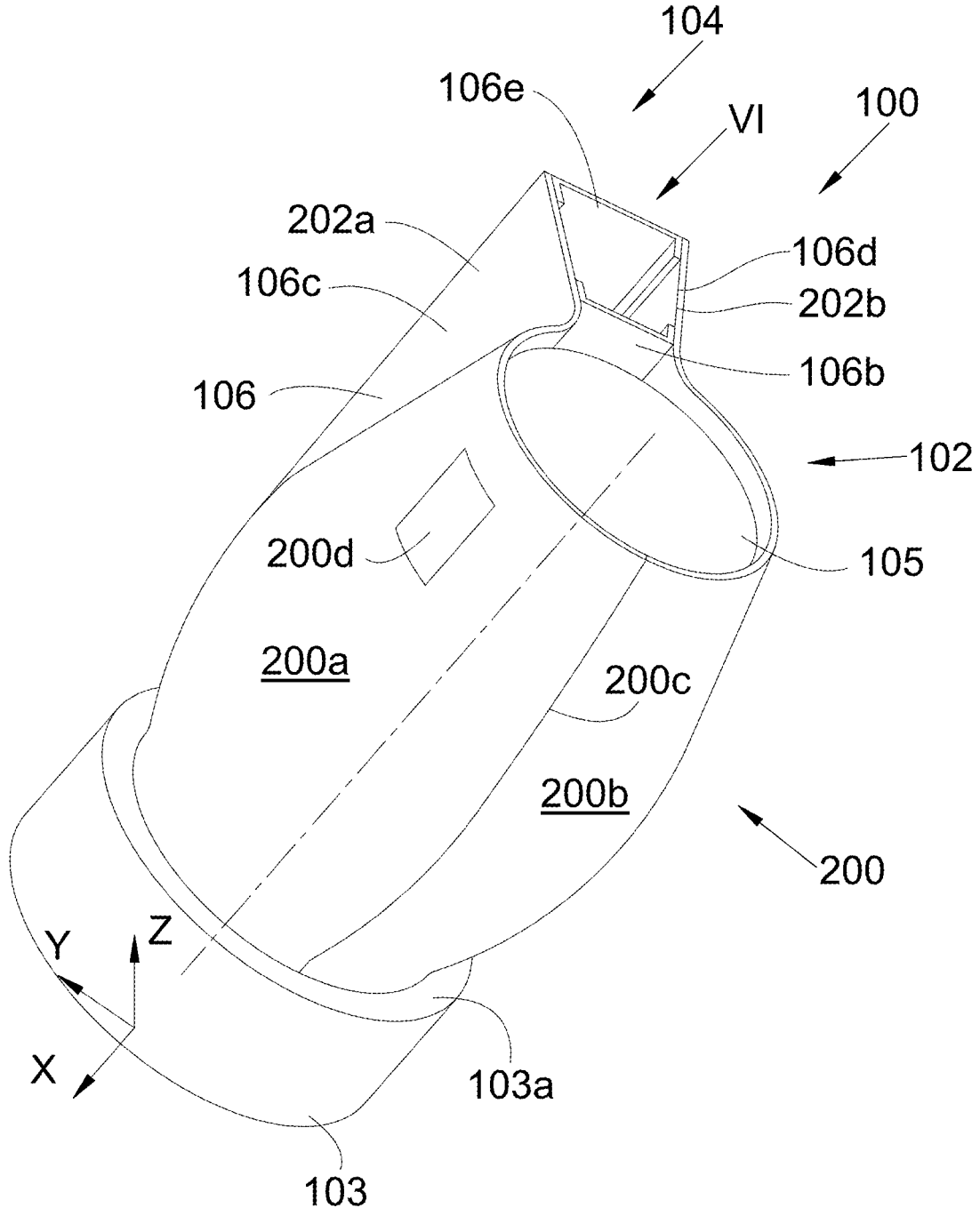
<u>Fig. 5</u>

PROPULSION SYSTEM FOR AN AIRCRAFT COMPRISING A TURBOJET, A PYLON AND ENGINE ATTACHMENT

CROSS-REFERENCES TO RELATED APPLICATIONS

This application claims the benefit of U.S. Provisional Application No. 63/512,100 filed on Jul. 6, 2023, and U.S. Provisional Application No. 63/512,101 filed on Jul. 6, 2023, and European Patent Application Number 24184671.6 filed on Jun. 26, 2024, the entire disclosures of which is incorporated herein by way of reference.

FIELD OF THE INVENTION

The present invention relates to the general field of attachment of a turbojet under the wing of an aircraft. It concerns in particular a propulsion system comprising a turbojet, in particular a double-flow engine, a pylon and a hooking device for hooking the turbojet under the pylon. It also applies to an aircraft equipped with such a propulsion system.

BACKGROUND OF THE INVENTION

A state-of-the-art propulsion system is attached under a wing of an aircraft. It has a turbojet and a pylon through which the turbojet is attached under the wing. The pylon has a rigid structure, also known as primary structure, with first attachment elements for attaching the turbojet.

These first attachment elements consist of a front engine attachment, a rear engine attachment, and a device to resume the thrust forces generated by the turbojet.

The pylon also has second attachment elements allowing the attachment of the pylon to the wing.

At the front, the turbojet has a fan casing surrounding an annular fan channel and, at the rear, a smaller central casing (also called: core casing) enclosing the engine core.

The front engine attachment is interposed between a front end of the rigid structure and an upper and front part of the core casing, and the rear engine attachment is interposed between the rigid structure and an upper and rear part of the same core casing. The device to resume the thrust forces generated by the turbojet comprises two connecting rods arranged on either side of a median vertical plane of the turbojet and articulated, on the one hand, on the core casing, and, on the other hand, on a single beam attached to the rigid structure. The device to resume the thrust forces, which is formed by the two connecting rods and beam, is designed to recover all or most of the forces directed in the X longitudinal direction of the turbojet.

The front engine attachment has a connecting rod on either side of the pylon, and each connecting rod is hinged by one end to the pylon and is hinged by the other end to the central housing. One of the connecting rods is secured by two link points to the pylon and by one link point to the core casing, and the second connecting rod is secured by one link point to the pylon and by one link point to the core casing.

The front engine attachment allows to resume, in its plane, part of the forces oriented according to the directions Y and Z as well as a moment of torsion Mx. The rear engine attachment has a triangular shackle that is hinged by one of its upper ends to the pylon and is hinged by one of its lower ends to the engine. This triangular shackle is therefore composed of an upper link point on the pylon side and positioned on the median plane of the pylon under its lower wall and two lower link points on the engine side and positioned on either side of the median plane of the pylon on the engine case. Such an arrangement also makes it possible to resume, in its plan, part of the efforts oriented according to the directions Y and Z.

Although such a structure is satisfactory, it is desirable to find an alternative arrangement that allows, among other things, a better transfer of loads.

SUMMARY OF THE INVENTION

An object of the present invention is to propose a propulsion system comprising a turbojet, a pylon and an engine attachment for attaching the turbojet under the pylon with better load transfer.

To this end, is proposed a propulsion system of an aircraft, said propulsion system comprising:
  a turbojet extending around a longitudinal axis and having a vertical median plane passing through the longitudinal axis and having a fan casing with a rear face perpendicular to the longitudinal axis,
  a pylon presenting a rigid structure with a front wall and a lower spar, and
  an engine attachment comprising a front ring coaxial with the longitudinal axis and comprising first fixation means for securing the front ring to the rear face of the fan casing and second fixation means for securing the front ring to the front wall of the pylon.

With such an arrangement, the forces are transmitted uniformly over the 360° of the front ring.

Advantageously, the engine attachment has a rear ring and a junction beam attached between the front ring and the rear ring, where the rear ring is coaxial with the longitudinal axis, is arranged at the rear of the front ring and is attached to the lower spar.

Advantageously, the pylon has a first rib which is fixed inside the rigid structure at the fixation between the rear ring and the lower spar.

Advantageously, the front ring consists of an upper half ring attached to the pylon and a lower half ring attached to the junction beam, the rear ring consists of an upper half ring attached to the pylon and a lower half ring attached to the junction beam, and engine attachment has two connecting rods arranged on either side of the median plane where each is mounted articulated between the two upper half rings.

Advantageously, the engine attachment has two rear connecting rods arranged on either side of the median plane where each is mounted hinged between the rear ring and the lower spar.

Advantageously, the pylon has a second rib which is attached inside the pylon at the fixation between the two rear connecting rods and the lower spar.

Advantageously, the first fixation means have two upper joints and two lower joints, where the two upper joints are arranged on either side of the median plane and in the upper part of the front ring, where the two lower joints are arranged on either side of the median plane and in the lower part of the front ring.

Advantageously, each upper joint forms a pivot connection around an axis parallel to a transverse axis perpendicular to the median plane, and each lower joint forms a pivot link around an axis parallel to a vertical axis inscribed in the median plane and perpendicular to the longitudinal axis.

Advantageously, the propulsion system comprises a nacelle in the form of two shells attached to each other and to the rear of the fan casing where the two shells are joined to the front ring.

Advantageously, each shell has an upper wall, where the two upper walls face each other and each constitutes a lateral wall of the pylon, and the two upper walls are fixed on either side of the lower spar.

The invention proposes also an aircraft comprising a wing and a propulsion system according to one of the preceding embodiments, the rigid structure of which is fixed under the wing.

BRIEF DESCRIPTION OF THE DRAWINGS

The characteristics of the invention will emerge more clearly from a reading of the following description of at least one embodiment, said description being produced with reference to the accompanying drawings, among which:

FIG. 5 is a perspective view of a particular nacelle assembly implemented in a propulsion system according to the invention.

DETAILED DESCRIPTION OF THE PREFERRED EMBODIMENTS

Figure 1:
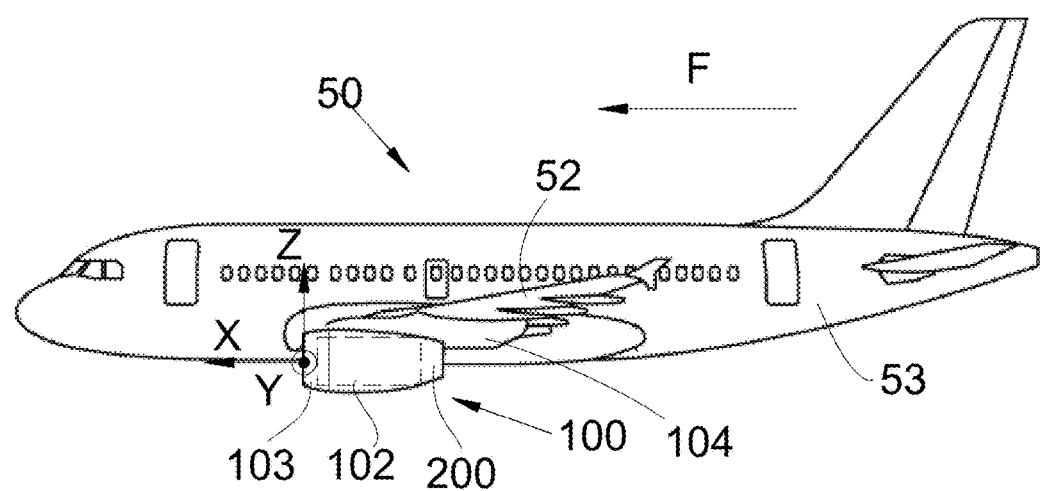
FIG. 1 represents a side view of an aircraft according to the invention.

FIG. 1 shows an aircraft 50 which has a wing 52 under which is mounted a propulsion system 100 according to the invention and which comprises a pylon 104 and a turbojet 102 housed here in a nacelle 200. In the embodiment of the invention shown in FIG. 1, the aircraft 50 has a fuselage 53 on each side of which a wing 52 is fixed.

By convention, X is the longitudinal axis of the turbojet 102, this axis X being parallel to a longitudinal direction of this turbojet 102. On the other hand, Y is the transverse axis of the turbojet 102 which is horizontal when the aircraft is on the ground, and Z is the vertical axis or vertical height when the aircraft is on the ground, these three axes X, Y and Z being orthogonal between them.

On the other hand, the terms "front" and "rear" are to be considered in relation to a direction of advance of the aircraft 50 during the operation of the turbojet 102, this direction being schematically represented by the arrow F.

The pylon 104 is generally symmetrical with respect to a median vertical plane XZ of the turbojet 102 which passes through the longitudinal axis X of the turbojet 102 and which is subsequently called median plane P and the transverse axis Y is perpendicular to the median plane P.

The vertical axis Z is inscribed in the median plane P and perpendicular to the longitudinal axis X.

Figure 2:
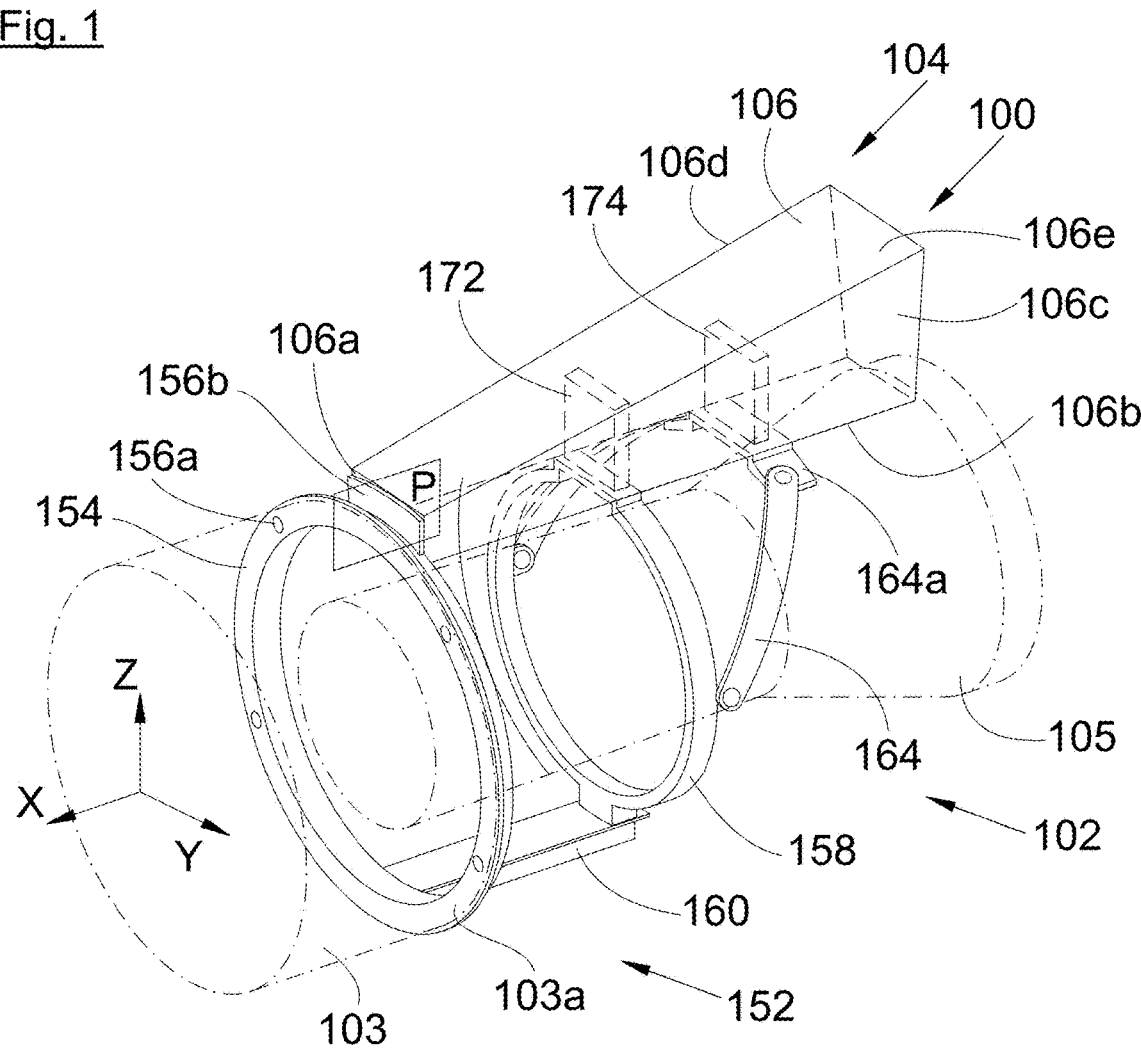
FIG. 2 is a perspective view of a propulsion system according to a first embodiment of the invention.

FIG. 2 shows the propulsion system 100 which comprises the turbojet 102 and the pylon 104 by which the turbojet 102 is attached to the wing 52 (not shown in FIG. 2). The pylon 104 is represented here by its rigid structure 106, also called primary structure, carrying an engine attachment 152 which ensures the attachment of the turbojet 102 under the rigid structure 106.

The rigid structure 106 takes the form of a box which has a front wall 106a which is at the front of the rigid structure 106, a lower spar 106b which extends below the rigid structure 106 and an upper spar 106e which extends to the top of rigid structure 106. The rigid structure 106 also has two lateral walls 106c-d on either side of the median plane P. These different spars and walls are fixed to each other to form the rigid structure 106.

To reinforce it structurally, the rigid structure 106 has here a first rib 172 and a second rib 174 which are fixed inside the rigid structure 106 to the various spars and walls. The second rib 174 is at the back of the first rib 172. Of course, a higher number of ribs is conceivable.

The rigid structure 106 is fixed to the wing 52 by a fastening system that is not represented, because it is outside the perimeter of the invention and can take any form known to the skilled person.

In the first embodiment of the invention shown in FIG. 2, the turbojet 102 comprises from front to back, a fan casing 103 in which is mounted a fan of the turbojet 102 and an engine casing 105 which is attached to the rear of the fan casing 103 and in which the other elements of the turbojet 102 are housed as compression stages, a combustion chamber, turbine stages and an ejection nozzle.

The fan casing 103 has a rear face 103a which is perpendicular to the longitudinal axis X and thus extends in a plane parallel to the plane YZ.

As shown in FIG. 2, the engine attachment 152 has a front ring 154 which is a structural element and is coaxial with the longitudinal axis X and thus extends in a plane parallel to the plane YZ. The front ring 154 is located at the rear face 103a of the fan housing 103. The engine casing 105 is thus housed inside the front ring 154.

The engine attachment 152 has first fixation means 156a that secure the front ring 154 to the rear face 103a of the fan casing 103. There are at least three first fixation means 156a distributed around the front ring 154 to ensure stress transmission over the 360° of the front ring 154. There are preferably a first fixation means 156a in the upper part of the front ring 154 and a first fixation means 156a in the lower part of the front ring 154.

To secure the front ring 154 to the front wall 106a of the pylon 104, the engine attachment 152 also has second fixation means 156b. Here, the second fixation means 156b take the form of a pallet 157 attached to the front ring 154 and fixed against the front wall 106a by any appropriate means of fastening such as screws or welding points. The second fixation means 156b provide here a rigid connection between the engine attachment 152 and the pylon 104. The pallet 157 can be the front wall 106a of the rigid structure 106. It can be integral with the front ring 154 or be a fixed component.

Figure 4:
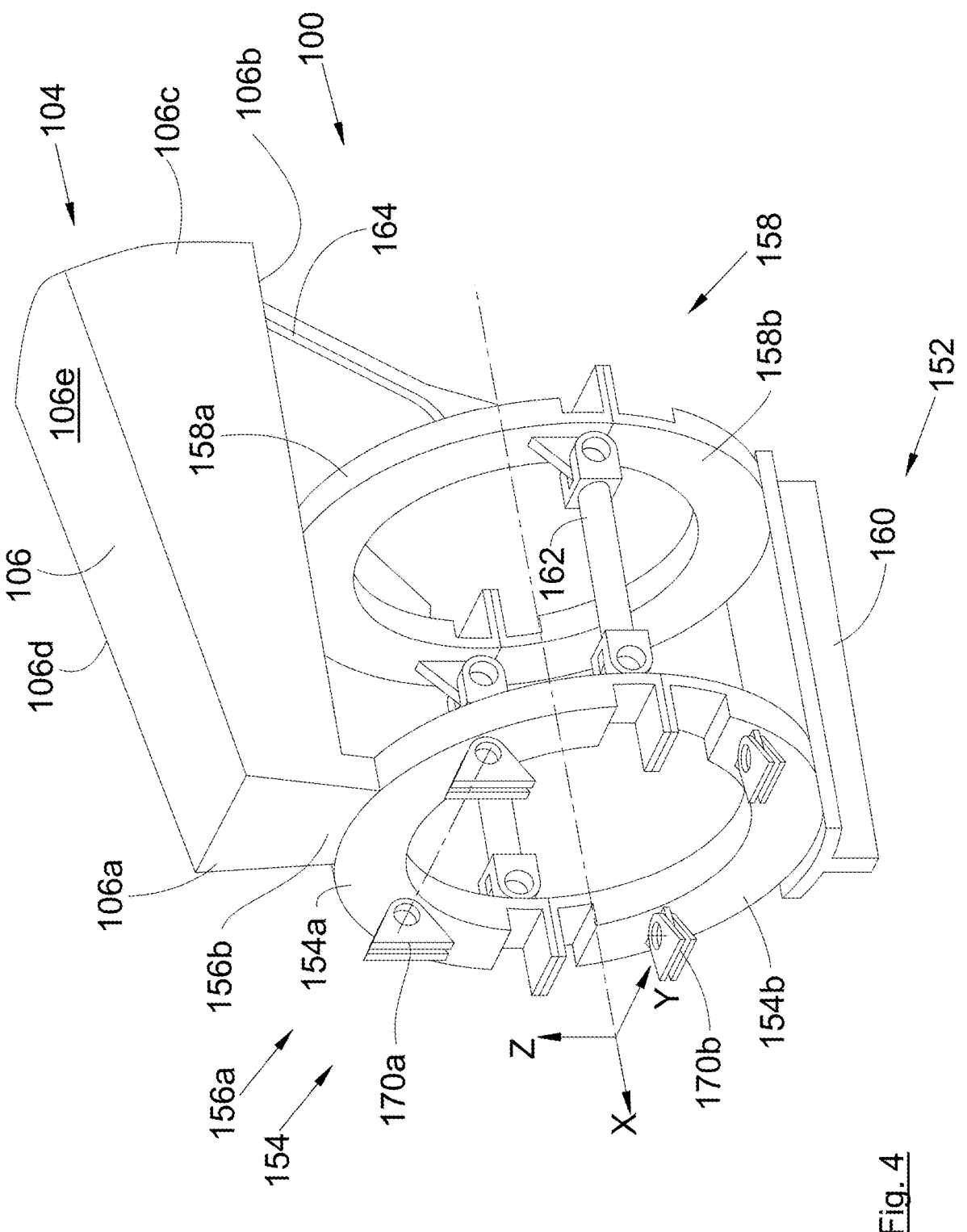
FIG. 4 is a perspective view of a propulsion system according to a second embodiment of the invention.

FIG. 4 shows a second embodiment in which the second fixation means 156b consist of the frontal wall 106a which extends down to the front ring 154 to be fixed there by any appropriate means such as fasteners or welding points.

Figure 3:
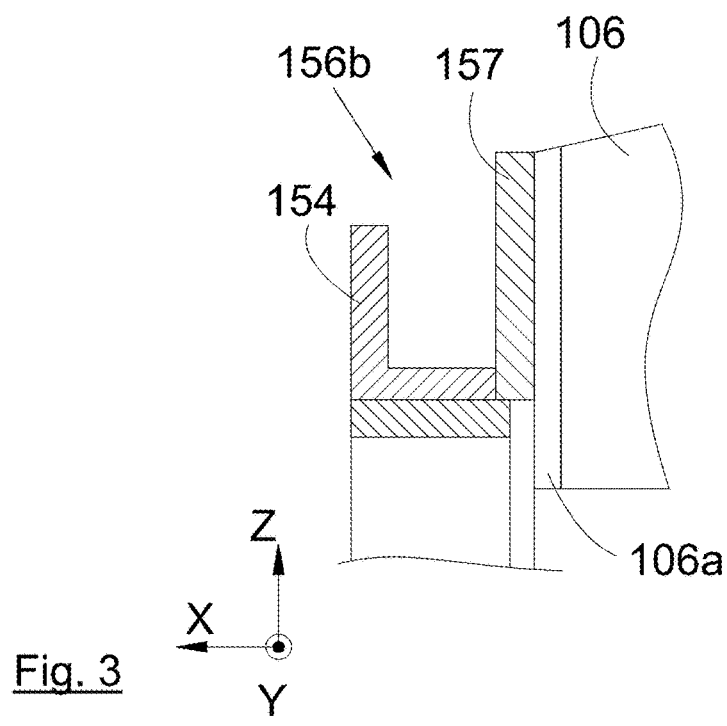
FIG. 3 is a detail and sectional view by a vertical median plane P of the propulsion system of FIG. 2.

FIG. 3 shows a cut at the level of the second fixation means 156b allowing to see the fixing of pallet 157 to the front ring 154 which presents here on its circumference a section in L.

As shown in FIG. 3, the engine casing 105 can be tightened in the front ring 154.

In the two embodiments shown in FIGS. 2 and 4, the engine attachment 152 has also a rear ring 158 which is also coaxial with the longitudinal axis X and which is arranged at the rear of the front ring 154. The rear ring 158 is attached to the lower spar 106b of the rigid structure 106 by any suitable means of fastening such as screws or welding points.

The engine attachment 152 comprises also a junction beam 160 attached between the front ring 154 and the rear ring 158. Here the junction beam 160 has a U-profile and the longitudinal ribs of the junction beam 160 reinforce the structure of the latter.

With such an arrangement, the forces are transmitted partly to the rear of the rigid structure 106. The junction beam 160 is fixed here in the lower part (at 6 o'clock) between the two rings 154 and 158.

To ensure a better rigidity at the lower spar 106b, the first rib 172 is fixed at the fixation between the rear ring 158 and the lower spar 106b and is fixed simultaneously to the rear ring 158 and the lower spar 106b. The fastening means which realize the fixation of the rear ring 158 to the lower spar 106b are also attached to the first rib 172 for example by sandwiching the lower spar 106b between the first rib 172 and the rear ring 158.

In the embodiment of the invention shown in FIG. 4, the front ring 154 is divided by a central horizontal plane so that the front ring 154 consists of an upper half ring 154a and a lower half ring 154b which are joined to each other by all appropriate means of solidarization as fasteners.

The upper half ring 154a is attached to the pylon 104 and the lower half ring 154b is attached to the junction beam 160.

Similarly, the rear ring 158 is divided by a central horizontal plane so that the rear ring 158 consists of an upper half ring 158a and a lower half ring 158b which are joined to each other by all appropriate means of solidarization as fasteners.

The upper half-ring 158a is attached to the pylon 104 and the lower half ring 158b is attached to the junction beam 160.

In addition, the engine attachment 152 has two connecting rods 162 which are arranged on either side of the median plane P and between the front ring 154 and the rear ring 158. Each connecting rod 162 has a front end mounted hinged on the upper half ring 154a of the front ring 154 and a rear end mounted hinged on the upper half ring 158a of the rear ring 158.

The two connecting rods 162 extend globally parallel to the longitudinal axis X and the joints of each connecting rod 162 take the form of a pivot link the axis of which is globally parallel to the transverse axis Y.

The installation of the turbojet 102 in rings 154 and 158 consists in moving back the turbojet 102 along the longitudinal axis X until bringing the rear face 103a of the fan casing 103 in the vicinity of the front ring 154 to put in place the first fixation means 156a.

To transmit some of the forces even further backward of the rigid structure 106, the engine attachment 152 has two rear connecting rods 164 that are arranged on either side of the median plane P. Each rear connecting rod 164 is at the rear of the rear ring 158 and each has a first end mounted articulated on the rear ring 158 at 3 o'clock and 9 o'clock and a second end mounted hinged on the lower spar 106b.

In the embodiment of the invention shown in FIG. 2, the attachment of the second end is provided through a bracket 164a which is attached to the lower spar 106b and each end of the bracket 164a is attached to the second end of a rear connecting rod 164. Here the rear connecting rods 164 have an arched shape and a rectangular section.

In the embodiment of FIG. 4, each rear connecting rod 164 is attached to the upper half ring 158a of the rear ring 158.

In the embodiment of the invention shown in FIG. 2, the articulation of each rear connecting rod 164 at the rear ring 158 takes the form of a pivot link, the axis of which is generally parallel to the transverse axis Y and the articulation of each rear connecting rod 164 at the lower spar 106b takes the form of a pivot link, the axis of which is generally parallel to the vertical axis Z.

As for the rear ring 158, to ensure a better rigidity at the lower spar 106b, the second rib 174 is fixed at the fixation between the rear connecting rods 164 and the lower spar 106b and is fixed simultaneously to the rear connecting rods 164 and the lower spar 106b.

In the first embodiment of the invention presented here, the first fixation means 156a take the form of holes through the front ring 154 and screws (not shown) that secure the rear face 103a by sandwiching this latter with the front ring 154. In the embodiment of the invention shown in FIG. 2, there are four first fixation means 156a which are distributed symmetrically with respect to the median plane P, but a different number which is at least equal to three is possible.

Such an arrangement may also be implemented in the second embodiment of the invention.

In the second embodiment of the invention shown in FIG. 4, the first fixation means 156a have two upper joints 170a and two lower joints 170b. The two upper joints 170a are arranged on either side of the median plane P and in the upper part of the ring before 154 and in the same way, the two lower joints 170b are arranged on either side of the median plane P and in the lower part of the front ring 154.

Such an arrangement may also be implemented in the first embodiment of the invention.

Each 170a-b joint takes the form of a clevis connection where a part, here a male part, of the clevis is attached to the front ring 154 and where a part, here a female part, of the clevis is attached to the rear face 103a.

Here, each upper joint 170a forms a pivot link around an axis parallel to the transverse axis Y and each lower joint 170b forms a pivot link around an axis parallel to the vertical axis Z.

The axes of the two upper joints 170a are aligned and the axes of the two lower joints 170b are parallel.

Figure 6:
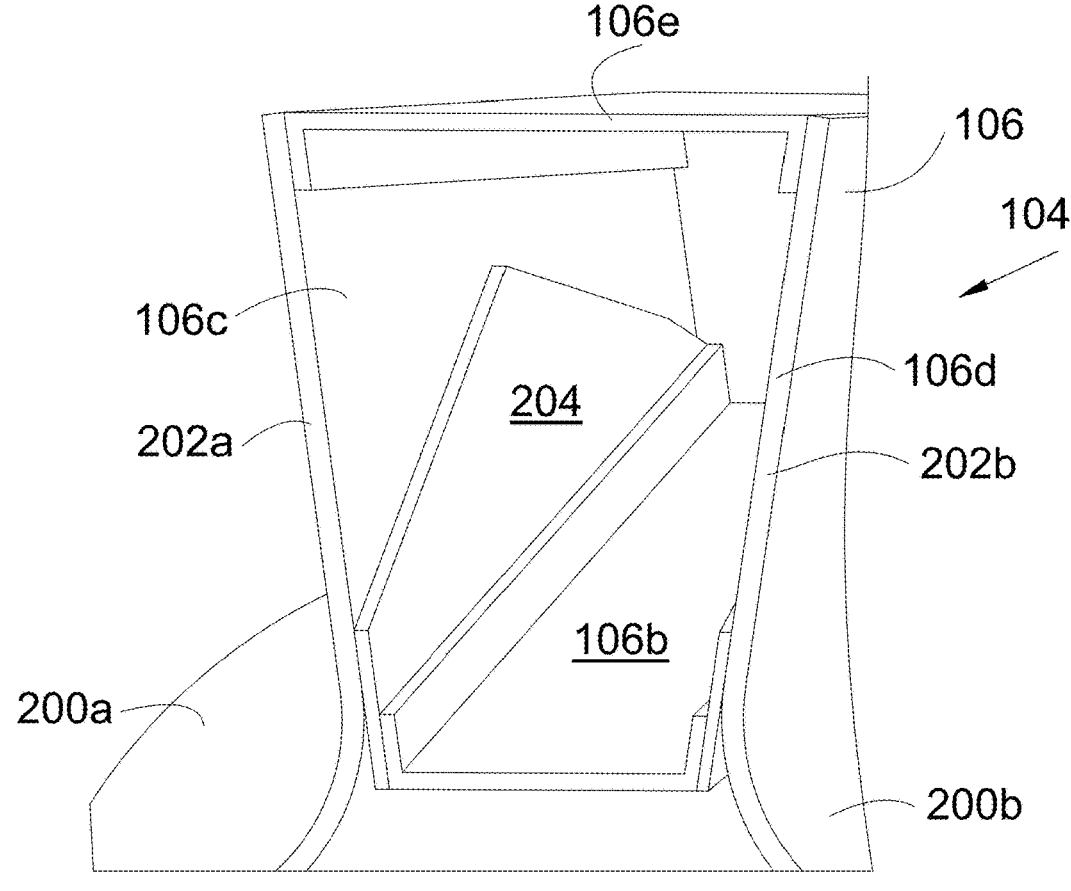
FIG. 6 is a detail of a part of the nacelle assembly of FIG. 5 seen according to arrow VI.

FIG. 5 and FIG. 6 show a particular embodiment of the invention, in which the propulsion system 100 comprises a nacelle 200 which forms a structural element ensuring a transfer of the forces from the turbojet 102 to the pylon 104.

The nacelle 200 is in the form of two shells 200a-b attached to each other. Each shell 200a-b has a first part in the form of a half-cylinder and the junction of the two shells 200a-b forms the nacelle 200 wrapping the engine housing 105.

The nacelle 200 is arranged at the rear of the fan casing 103 where the two shells 200a-b are attached to the front ring 154.

In the lower part of the nacelle 200, the two shells 200a-b are joined at a contact line 200c which is here in the median plane P and the fixation is ensured by all appropriate means such as welding points or screw elements.

In the embodiment of the invention presented in FIG. 5 and FIG. 6, that is to say in the upper part of the nacelle 200, each shell 200a-b has a second part in the form of an upper wall 202a-b attached to the first part.

The upper walls 202a-b face each other and extend on both sides of the median plane P and globally parallel to the median plane P, i.e. vertically.

Each upper wall 202a-b forms a lateral wall 106c-d of the pylon 104 and the two upper walls 202a-b are attached to either side of the lower spar 106b and the upper spar 106e.

Such an arrangement allows a gain in weight and an easier mounting due to the small number of parts of the nacelle 200. This arrangement also allows a complete integration of the pylon 104 to the nacelle 200.

As shown in FIG. 6, the lower spar 106*b* and the upper spar 106*e* are fixed between the upper walls 202*a-b* by any suitable means of fastening such as welding points or screw elements.

For the lower spar 106*b*, it is here fixed via intermediate walls 204 where each is attached to an upper wall 202*a-b* and extends downwards said upper wall 202*a-b*. The lower spar 106*b* is then fixed between the intermediate walls 204.

Doors 200*d* can also be provided on the nacelle 200 to allow access inside the latter.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A propulsion system of an aircraft, said propulsion system comprising:
   a turbojet extending around a longitudinal axis and having a vertical median plane passing through the longitudinal axis and having a fan casing with a rear face perpendicular to the longitudinal axis,
   a pylon presenting a rigid structure with a front wall and a lower spar, and
   an engine attachment comprising a front ring coaxial with the longitudinal axis and comprising first fixation means for securing the front ring to the rear face of the fan casing and second fixation means for securing the front ring to the front wall of the pylon,
   wherein the engine attachment has a rear ring and a junction beam attached between the front ring and the rear ring,
   wherein the rear ring is coaxial with the longitudinal axis, and is arranged at the rear of the front ring, and is attached to the lower spar,
   wherein the pylon has a first rib which is fixed inside the rigid structure at a fixation between the rear ring and the lower spar.

2. The propulsion system according to claim 1, wherein the front ring comprises of an upper half ring attached to the pylon and a lower half ring attached to the junction beam,
   wherein the rear ring comprises an upper half ring attached to the pylon and a lower half ring attached to the junction beam, and
   wherein the engine attachment has two connecting rods arranged on either side of the vertical median plane where each is mounted articulated between the two upper half rings.

3. The propulsion system according to claim 1, wherein the engine attachment has two rear connecting rods arranged on either side of the vertical median plane where each is mounted hinged between a rear ring and the lower spar.

4. The propulsion system according to claim 3, wherein the pylon has a second rib which is attached inside the pylon at a fixation between the two rear connecting rods and the lower spar.

5. The propulsion system according to claim 1, wherein the first fixation means have two upper joints and two lower joints, wherein the two upper joints are arranged on either side of the vertical median plane and in an upper part of the front ring, and wherein the two lower joints are arranged on either side of the vertical median plane and in a lower part of the front ring.

6. The propulsion system according to claim 5, wherein each upper joint forms a pivot connection around an axis parallel to a transverse axis perpendicular to the median plane, and
   wherein each lower joint forms a pivot link around an axis parallel to a vertical axis inscribed in the vertical median plane and perpendicular to the longitudinal axis.

7. The propulsion system according to claim 1, further comprising:
   a nacelle comprising two shells attached to each other and to the rear of the fan casing where the two shells are joined to the front ring.

8. The propulsion system according to claim 7, wherein each shell has an upper wall,
   wherein the upper walls face each other and each constitutes a lateral wall of the pylon, and
   wherein the two upper walls are fixed on either side of the lower spar.

9. An aircraft comprising:
   a wing, and
   the propulsion system according to claim 1, wherein the rigid structure of which is fixed under the wing.

* * * * *